No. 793,629. PATENTED JULY 4, 1905.
S. C. ANKER-HOLTH.
FLOAT VALVE.
APPLICATION FILED OCT. 6, 1904.

WITNESSES:
J. N. Daggett.
F. W. Hoffmeister.

INVENTOR.
S. C. Anker Holth.
By J. C. Warnes,
Atty.

No. 793,629.

Patented July 4, 1905.

UNITED STATES PATENT OFFICE.

SEVERIN C. ANKER-HOLTH, OF RIVERSIDE, ILLINOIS, ASSIGNOR TO INTERNATIONAL HARVESTER COMPANY, A CORPORATION OF NEW JERSEY.

FLOAT-VALVE.

SPECIFICATION forming part of Letters Patent No. 793,629, dated July 4, 1905.

Application filed October 6, 1904. Serial No. 227,331.

*To all whom it may concern:*

Be it known that I, SEVERIN C. ANKER-HOLTH, a citizen of the United States, residing at Riverside, in the county of Cook and State of Illinois, have invented a new and useful Improvement in Float-Valves, of which the following is a complete specification.

While this improvement is applicable to many of the various liquid-feed regulators, it is more particularly designed to be used in connection with cream-separators, in connection with which it is shown, the object being to produce a uniform feed of the milk to the bowl of the machine from a supply-tank of varying head.

A further object of the invention consists in the lowering of the supply-inlet relative to the machine, the desirability of which is obvious, since the elevation of the supply-tank will be governed by that of the supply-inlet.

Another object consists in combining the regulating mechanism with the cock or faucet which admits the milk to the machine.

Like reference-numerals refer to like parts throughout the several views.

The preferred construction of this invention has been embodied in the mechanism as set forth in the accompanying drawings, in which—

Figure 3:
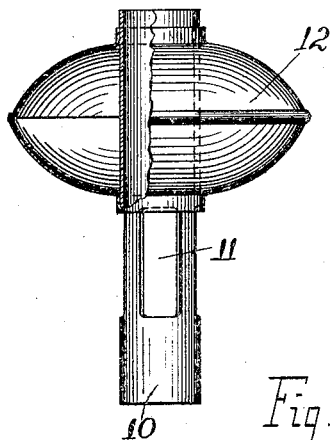
Figure 2:
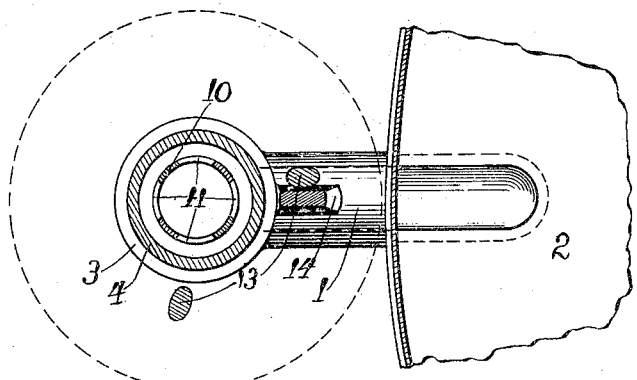
Figures 1, 4:
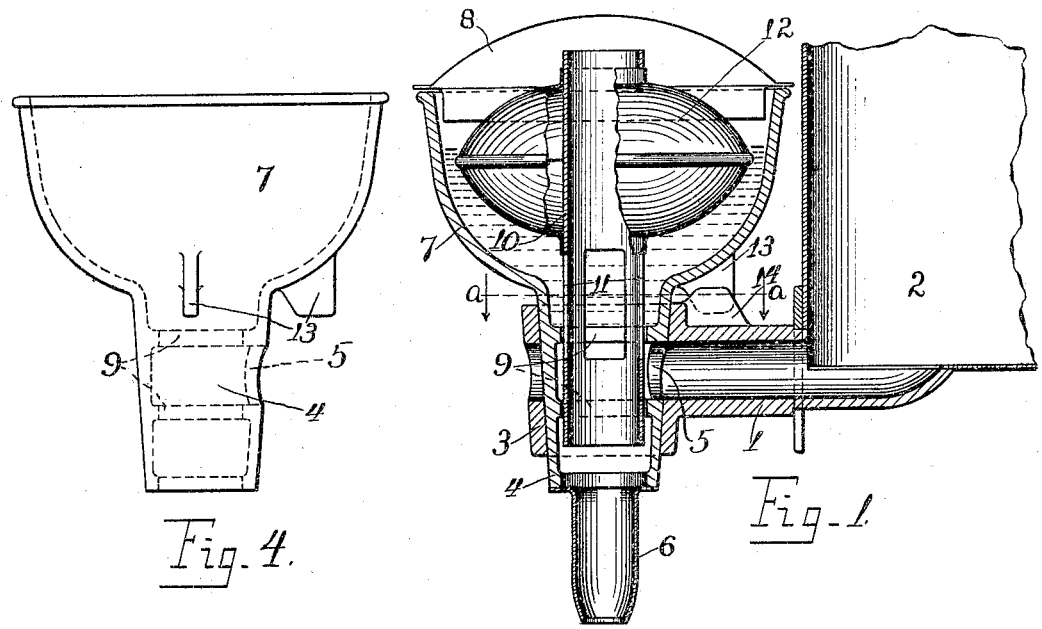
Figure 5:
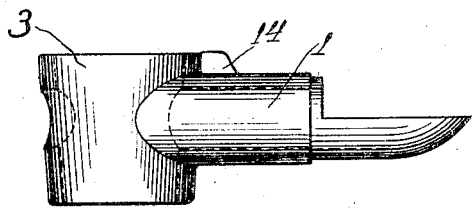

Figure 1 represents a sectional elevation of the complete device. Fig. 2 is a plan section taken as indicated by the line *a a* in Fig. 1. Fig. 3 is a detail view of the sleeve-valve and float in connection therewith. Fig. 4 represents a side elevation of the hollow plug and float-chamber, and Fig. 5 is a detail showing in side elevation the supply-inlet and the valve-casing in connection therewith.

I am aware that it is not new to regulate the supply of milk to a cream-separator by means of a float actuated by the overflow into the float-chamber; but what I claim, and believe to be new, is to actuate the regulating means directly by the float in order to adjust the size of the supply-inlet, thus getting more immediate results, and hence a more uniform feed, than would be obtained if the outlet would be checked by means rendered operative by the submerging of a float.

In the drawings, 1 designates the supply-inlet leading from the supply tank or reservoir 2. On the delivery end of the supply-inlet is formed the valve-casing 3, of a barrel form, suitable for receiving the hollow conical plug 4, which forms the receiving-chamber of the feed-regulating mechanism. The plug 4 is provided on one side with the opening 5, which communicates with the passage-way of the supply-inlet 1 when the plug is turned to proper position; but when turned to a non-registering position the passage-way will be closed, as in an ordinary plug-valve. To the lower end of the plug 4 is secured the contracted nipple 6, the diameter of the discharge end thereof being of a diameter somewhat less than that of the supply-inlet 1. At the upper end of the hollow plug is formed the float-chamber 7, preferably of bowl shape and provided with the lid 8. Within the receiving-chamber formed by the hollow plug 4 are the two slight annular flange projections 9, which form seats or guides for the sleeve-valve 10. This sleeve-valve consists of a tube into which are cut, below the center thereof, the longitudinal slots 11, the function of the slots being to admit the liquid from the supply-inlet into the receiving-chamber. The sleeve-valve 10 is longitudinally movable, the longitudinal movement being effected by means of the float 12, which is secured to its upper end and which lies within the float-chamber 7. To limit the rotative movement of the plug and bowl and to enable the opening 5 to be readily brought to a registering or non-registering position with respect to the opening 5 in the supply-inlet, the stops 13 on the bowl 7 are made to contact the lug 14 on the supply-inlet, as clearly shown in Figs. 1 and 2.

The operation of the mechanism is as follows: The reservoir 2 having been supplied with milk and the bowl and plug turned until the opening 5 is made to register with the opening in the inlet-pipe, the milk will be caused to raise in the float-chamber 7 an amount depending upon the excess in the area of the inlet-opening over the discharge-orifice and also upon the size and position of the slots 11. The size of the various openings is such that sufficient pressure will be produced in the receiving-chamber to cause the liquid to rise in the float-chamber substantially to the height indicated in Fig. 1. In the position here shown the effective opening from the supply-inlet 1 into the receiving-chamber is less than half the total area of same, the tube 10 having been lifted by the float 12 until only a small portion of the slot 11 remains in effective position. If the head in the supply-tank remains constant, the float and sleeve valve will remain stationary; but if the head changes, as it invariably does—growing less, for instance—then the pressure in the receiving-chamber of the hollow plug 4 will diminish, which will cause a corresponding fall of the liquid in the float-chamber 7. It is manifest that simultaneously with the fall of the float a greater extent of the area of the slots 11 will be exposed, the result being to immediately restore the normal pressure in the receiving-chamber. It is further manifest that the upward or downward movement of the float and the sustaining liquid therefor is simultaneous and in the same direction, thus effecting the adjustment of the supply-inlet opening direct and quickly as distinguished from that class of devices in which the liquid is made to fill and submerge or partially empty a float in order to effect the adjustment of the opening in the regulating mechanism. The last-described method is attended with fluctuations of pressure in the receiving-chamber more or less marked, which is largely overcome by the improved device constructed and operated as above set forth.

What I claim as my invention, and desire to secure by Letters Patent, is—

1. In a float-valve, in combination, a supply-inlet having formed integral therewith a valve-casing, a hollow plug fitting into said casing, the said plug being provided with an opening which communicates with the said supply-inlet, a float-chamber formed upon the upper end of said hollow plug, a valve fitted loosely within said hollow plug and arranged to register to a variable extent with the said opening therein and, by the longitudinal adjustment of said valve, to regulate the amount of liquid admitted therethrough, and a float actuated by the overflow into said float-chamber for effecting the longitudinal adjustment of said valve, substantially as set forth.

2. In a float-valve, in combination, a supply-inlet having formed integral therewith a valve-casing and an upwardly-projecting stop-forming lug, a rotatable hollow plug fitting into said casing, said plug being provided with an opening which communicates with the said supply-inlet, stops movable with the said plug arranged to contact the said lug on the valve-casing, a sleeve-valve fitted loosely within said hollow plug and arranged to register, to a variable extent, with the said opening therein and, by the longitudinal adjustment of said sleeve, to regulate the amount of liquid admitted therethrough, and a float actuated by the overflow into the said float-chamber for effecting the longitudinal adjustment of said sleeve-valve, substantially as set forth.

S. C. ANKER HOLTH.

Witnesses:
MARGARET A. SWEENEY,
J. C. WARNES.